United States Patent [19]

Higgins et al.

[11] Patent Number: 5,165,168
[45] Date of Patent: Nov. 24, 1992

[54] METHOD OF MAKING A HIGH RISE SPOUT AND SPOUT MADE ACCORDING TO THE METHOD

[76] Inventors: Larry B. Higgins, 1894 Kosiara, Gaylord, Mich. 49735; Frank Tolstyka, Jr., 7641 Corey Rd., Cheboygan, Mich. 49721

[21] Appl. No.: 833,591

[22] Filed: Feb. 10, 1992

Related U.S. Application Data

[63] Continuation of Ser. No. 682,641, Apr. 9, 1991, abandoned.

[51] Int. Cl.⁵ .............................................. B21D 9/00
[52] U.S. Cl. .................................. 29/890.141; 72/367
[58] Field of Search ......... 29/890.14, 80.141, 890.142, 29/890.143, 890.144, 890.149; 72/367, 368, 369, 370; 137/801

[56] References Cited

U.S. PATENT DOCUMENTS

| | | | |
|---|---|---|---|
| 1,783,088 | 11/1930 | Hill | 72/370 X |
| 1,993,361 | 3/1935 | Cornell, Jr. | 153/32 |
| 2,844,185 | 7/1958 | Enghauser | 153/48 |
| 3,104,464 | 9/1963 | Frink | 29/566 |
| 3,645,493 | 2/1972 | Manoogian et al. | 251/120 |
| 3,810,302 | 5/1974 | Broers et al. | 29/600 |
| 4,037,624 | 7/1977 | Turner et al. | 137/801 X |
| 4,098,106 | 7/1978 | Yamaguchi | 72/128 |
| 4,157,654 | 6/1979 | Kahlow et al. | 72/367 |
| 4,452,063 | 6/1984 | Sebastiani et al. | 72/356 |
| 4,467,511 | 8/1984 | Collgon | 72/367 X |
| 4,691,550 | 9/1987 | Dietzel | 72/68 |
| 4,757,841 | 7/1988 | Lucas | 137/801 |
| 4,841,760 | 6/1989 | Ferguson | 72/133 |
| 4,930,331 | 6/1990 | Manning | 72/396 |
| 4,997,008 | 3/1991 | Zbin | 137/801 |

OTHER PUBLICATIONS

Memorandium from Frank Tolstyka to Larry Higgins Dated Jan. 29, 1992 regarding "D" Tube Process.

*Primary Examiner*—Joseph M. Gorski
*Attorney, Agent, or Firm*—Brooks & Kushman

[57] ABSTRACT

A method of making a water spout (20) from an elliptical preformed tube (24, 26, 28). An outlet end (30) is formed from the tube at the opposite end of a central body portion (38) from an inlet end (34). The central body portion (38) has an arcuate extent of more than ninety degrees and is formed in a roll-forming operation. The method includes forming an outlet trim line edge (46) on the outlet end (30). A U-shaped slot (50) is formed in a lower surface (52). A flange forming tool (58) forms parallel walls (66) and a curved wall (68). A forming tool (70) having a horseshoe shaped cavity operates with a backup die (72) to form the distal end (76) of the outlet end (30) of the tube into an arcuate wall (78). The arcuate wall (78), parallel wall (66) and curved wall (68) flow together and are trimmed to form an aerator trim lip (82) on which a standard aerator is received. The inlet end (34) is formed on one end of an elliptically shaped preform to a round shape. Seal grooves (42) are formed on the inlet end (34) with roll forming tools.

17 Claims, 2 Drawing Sheets

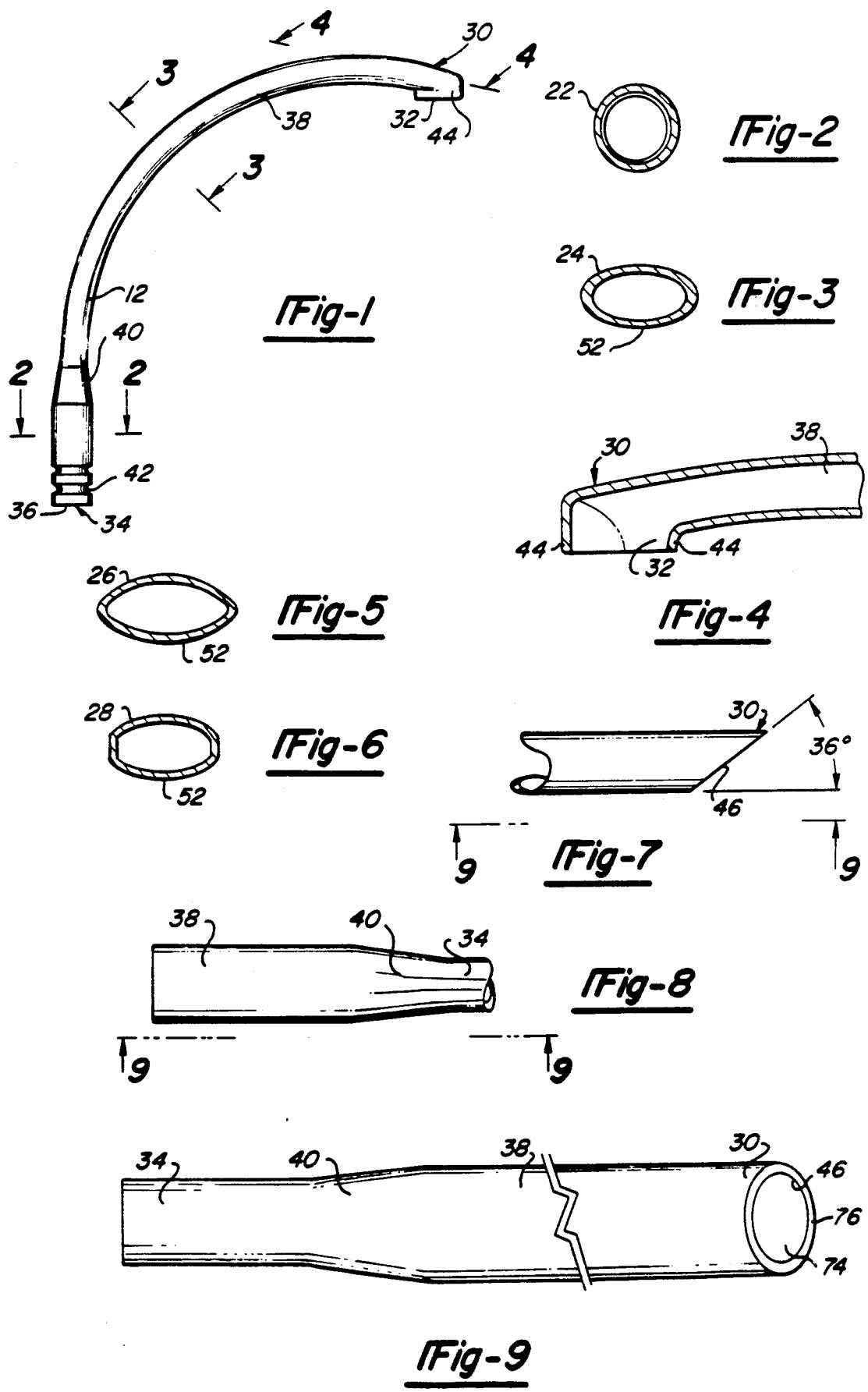

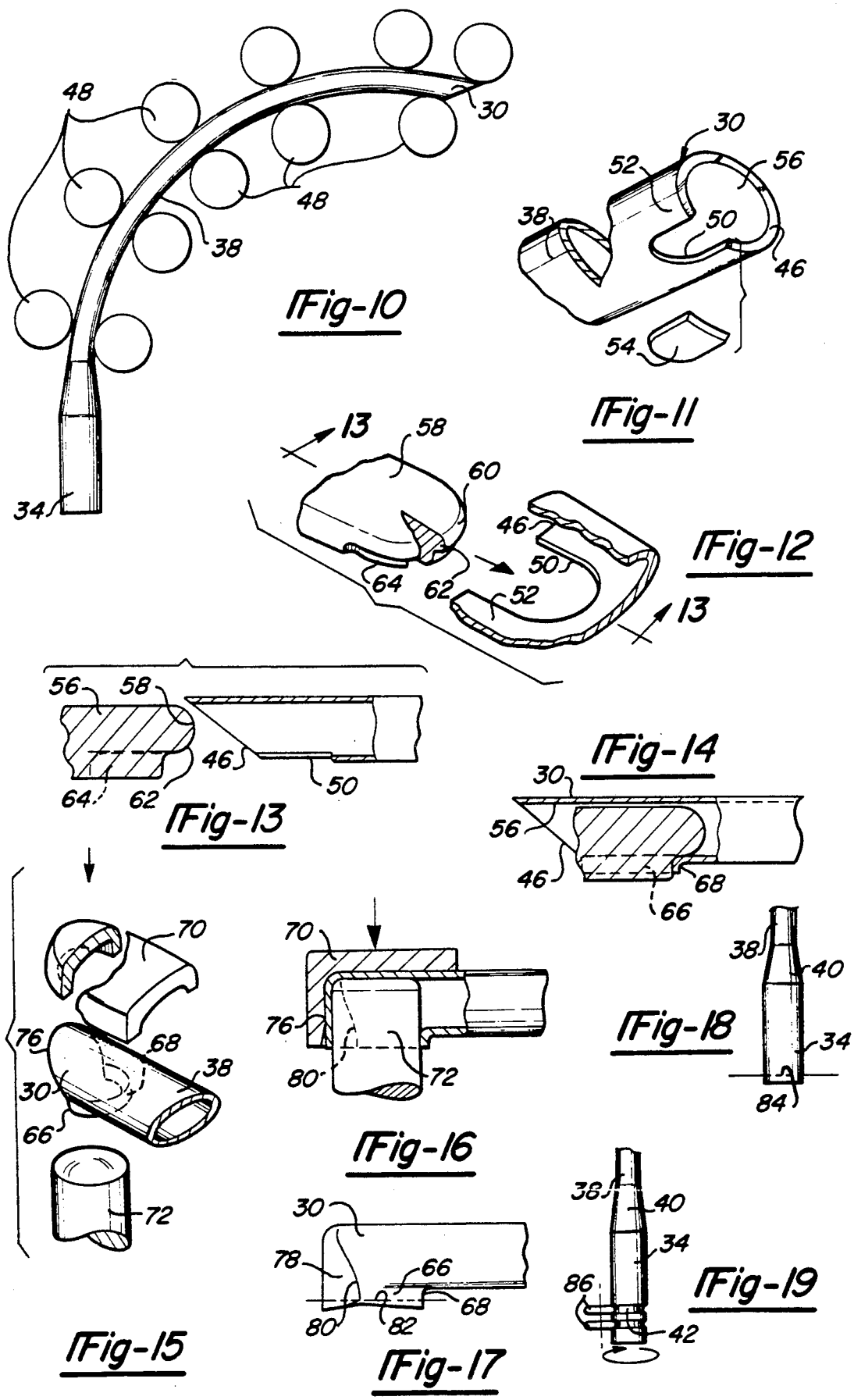

METHOD OF MAKING A HIGH RISE SPOUT AND SPOUT MADE ACCORDING TO THE METHOD

This is a continuation of co-pending application Ser. No. 682,641, filed on Apr. 9, 1991, and now abandoned.

TECHNICAL FIELD

The present invention relates to the forming of a water spout for use in a faucet assembly and more particularly to forming a one piece water spout having a high rise profile. The invention also relates to the water spout made according to the method.

BACKGROUND OF INVENTION

High rise, or waterfall, water spouts are a popular option for modern kitchen sink faucets. High rise spouts permit pots and pans to be moved easily below the spout with less interference than normal sink water spouts. In addition to convenience, waterfall spouts offer excellent aesthetics and are recommended by kitchen designers.

Conventional low rise water spouts have a tube which defines the water spout of desired shape which is braised to a cast inlet fitting. An outlet of the conventional low rise water spout is often formed in the distal end of the spout. Such an outlet typically extends perpendicular to the spout, changing the direction of the water flow at the interface of the spout and outlet.

Typically, high rise water spouts used in commercial kitchens have a round tube bent in a J-shaped configuration. Water exits the distal end of the tube downwardly in the direction of the water flow. Commercial high rise water spouts are not favored in residential kitchens due to the lack of aesthetic appeal. They are, however, easy to form by normal tube bending operations. The distal end is threaded to receive an aerator or other fitting to form an outlet.

Recently, more stylized high rise water spouts have been developed using hydroforming techniques. Stylized hydroformed water spouts are generally formed by placing a curved tube in a hydroforming die. High pressure fluid is then injected into the tube. The tube expands under the fluid pressure to fill the cavity. After the hydroforming, the grain structure of the tube is expanded resulting in a low quality surface finish. Hydroformed tubes are then buffed and polished to improve surface finish and are coated with an enamel or other coating which can cover surface imperfections. Other stylized high rise water spouts are formed by braising a shaped tube to a cast outlet. Cast outlets are cast and machined and add considerable expense to the finished high rise water spout.

DISCLOSURE OF INVENTION

An object of the present invention is to form a stylized high rise water spout having a body which is integrally formed.

Another object of the present invention is to form a water spout from tubing which is easily surface finished by chrome plating or otherwise without excessive surface treatment.

A further object of the invention is to form a high rise water spout which does not require a cast and machined outlet end.

Yet another object of the invention is to form a high rise water spout, the distal end of which extends in a slightly downwardly extending direction and is adapted to receive a standard aerator with the water flow opening of the aerator in a plane perpendicular to the direction of water flow from the spout.

A still further object of the invention is to form a high rise water spout with excellent aesthetics by means of an economical process.

In carrying out the above and other objects, the present invention relates to a method for making an internal water spout from a tube having first and second ends defining inlet and outlet ends. The method includes the steps of trimming the outlet end of the tube at an acute angle whereby an elliptically shaped opening is formed by the tube wall. Such an opening is defined by proximate and distal wall portions with respect to the tube. The inlet end of the tube is formed to be received in a faucet assembly. The tube is bent to form an arcuate portion intermediate the inlet end and the outlet ends. A slot is punched into the proximate wall portion of the tube at the outlet end. A delivery end wall is formed in part from the periphery of the proximate wall portion of the tube about the slot. The distal wall portion is then formed to complete the delivery end wall. The delivery end wall is trimmed to a pre-determined length and the inner diameter of the delivery end wall is machined to form a receptacle for an aerator.

According to another aspect of the invention, the method for making a water spout also relates to forming a pre-determined length of the inlet end of the tube from a non-cylindrical tubular preform into a cylindrical shape. An outlet is provided at the outlet end of the tube and the tube is bent into an arcuate shape intermediate to the inlet end and the outlet end. The inlet end of the tube is trimmed and annular grooves are formed in the inlet end to receive sealing means.

According to another aspect of the present invention, the inlet end and outlet end of the water spout are formed as described above in combination.

Other aspects of the invention relate to forming a tube into a non-cylindrical shape by drawing the same from a cylindrical tube and annealing it prior to the forming operations. The tube may be drawn into a substantially elliptical cross-section. The step of bending the tube preferably comprises forming a bend at an angle of greater than ninety degrees from the inlet end to the outlet end of the tube. The method further includes a step of punching a generally U-shaped slot in a portion of the wall of the tube at the outlet end. The forming step then includes forming the tube wall around the perimeter of the punched slot.

The present invention also relates to a water spout formed from a one piece tubular member. The water spout has a cylindrical end extending a pre-determined distance from an inlet opening. The water spout includes a substantially elliptical central body portion which extends arcuately upwardly from the inlet end to an outlet end. The outlet end is provided at the opposite end of the central body portion from the inlet end and has an outlet opening formed at the outlet end. The outlet end features a delivery wall extending generally perpendicular from the tube wall about a perimeter of an outlet opening.

These and other objects and advantages of the invention will become more apparent in view of the attached drawings and in the light of the following detailed description of a preferred embodiment of the invention.

BRIEF DESCRIPTION OF DRAWING

FIG. 1 is a perspective view of an high rise water spout made in accordance with the present invention;

FIG. 2 is a cross-sectional view taken along the line 2—2 in FIG. 1;

FIG. 3 is a cross-sectional view taken along the line 3—3 in FIG. 1;

FIG. 4 is a fragmentary cross-sectional view taken along the line 4—4 in FIG. 1;

FIG. 5 is an alternative tube cross-section which the water spout of the present invention may be constructed;

FIG. 6 is an alternative tube cross-section which the water spout of the present invention may be constructed;

FIG. 7 is a fragmentary elevation view of an outlet end of a tube blank after an angular cutting operation;

FIG. 8 is a fragmentary elevation view showing an inlet end of the tube after forming;

FIG. 9 is a plan view taken along the line 9—9 in FIG. 7 showing the outlet and the inlet ends;

FIG. 10 is a schematic view showing a row forming operation used to form the water spout;

FIG. 11 is a perspective view showing a notching operation of the outlet end of the water spout;

FIG. 12 is a fragmentary perspective view showing a forming tube about to engage the outlet end of the tube;

FIG. 13 is a cross-sectional view taken along the line 13—13 in FIG. 12;

FIG. 14 is a partial cross-sectional view showing the forming tool forming a wall about a slot at the outlet end of the water spout;

FIG. 15 is an exploded fragmentary view showing the end forming operation at the outlet end of the water spout;

FIG. 16 is a cross-sectional view showing the end forming tool engaging in the outlet end of the water spout;

FIG. 16 is a side elevation view illustrating the trim operation at the outlet end;

FIG. 18 is a side elevation view showing an trimming operation at the inlet end of the water spout; and FIG. 19 is a diagrammatic elevation view showing the roll forming operation used to form sealing receptacle recesses at the inlet end of the water spout.

BEST MODE FOR CARRYING OUT INVENTION

Referring to FIG. 1 of the drawings, a water spout 20 for a faucet assembly (not shown) made in accordance with the present invention is shown. As is more fully hereinafter described, the water spout is formed from a single tube. The water spout 20 is formed from a tube 22 of circular cross-section as shown in FIG. 2. The tube 22 is preformed into a specialized shape which may be generally referred to as an elliptical shape. As used herein, the term "elliptical" is deemed to include a range of different preformed shapes including the elliptical tube preform 24 illustrated in cross-section in FIG. 3, a pointed elliptically shaped tube 26 shown in FIG. 5 or a double-D tube preform 28 as shown in FIG. 6.

The drawing process in the preferred embodiment of the invention begins with a 1⅜"×0.90 ×16#70/30 seamless tube. The tube is drawn to 1⅛"×0.056 in a first draw step and then is drawn to 1.062"×0.040. After the second drawing step, the tube is annealed at 1150° F./23 inches per minute. The tube is then drawn to its finished elliptical preform shape preferably 0.775"×0.035 round equivalent. After forming to shape, the pre-form tube is finish annealed at 1050° F./23 inches per minute. The tube then is tempered to 70/75-15 Rockwell T-scale and has a grain structure of 0.025-035 mm.

As shown in FIG. 1, the water spout 20 has an outlet end 30 which defines an outlet opening 32 through which water is dispensed in a generally vertically downward direction perpendicular to the plane of the outlet opening 32. An inlet end 34 is provided at the opposite end of the water spout 20 from the outlet end 30. The inlet end 34 defines an inlet opening 36 which is preferably circular in cross-section to allow the water spout 20 to be directly fitted into a standard water faucet valve.

The inlet end 34 has a circular cross-sectional shape as shown in FIG. 2. The inlet end diameter is smaller than the diameter of the original tube from which the water spout 20 is formed.

A central body 38 is provided between the outlet end 30 and, the inlet end 34. As shown in FIG. 7, the outlet end 30 of the tube is cut at an acute angle. In the preferred form the angle of cut is approximately 36°. This creates an overhanging portion 36 which extends above and outwardly from a lower surface 52. The outlet trim line edge 46 defines a distally oriented opening and has a distal portion and a proximal portion.

Referring now to FIG. 8, the inlet end 34 of the tube and the central body 38 are shown interconnected by a transition region 40. The inlet end is formed by reforming the preformed tube to a round equivalent preferably sized to 0.750" OD for a distance of approximately 2". The reforming step is performed by a cylindrical cold forming tool having a tapered nose portion which pilots the tool within the tube preform. A second preforming operation is performed by an external sizing punch having a ¾" round external forming opening. The external sizing punch is preferably a carbide tool. In FIG. 9, the inlet end and outlet ends are shown side-by-side immediately prior to forming the arcuate shape of the central body portion of the spout.

Referring to FIG. 10, the central body 38 is formed into a curved shape. The forming operation is performed by a series of rollers 48 which are diagrammatically depicted in FIG. 10.

Referring now to FIG. 11, the next step in forming the outlet end 30 forming operation is illustrated. A U-shaped slot 50 is punched from the lower surface 52 of the outlet end 30 preferably by removal of a slug 54 from the lower surface 52.

The next step of the forming operation is shown in FIGS. 12 through 14 wherein a transforming tool 58 is driven into the slot 50 in the lower surface 52. The transforming tool 58 has a bullet nose 60 to provide a tapered entry through the outlet trim line edge 46. The transforming tool 58 forms the edges of the slot 52. As the transforming tool 58 is inserted into slot 50, a lip 62 pilots the tool 58 in the elliptical tube preform 24. A recessed wall 64 below the lip 62 turns the edges of the U-shaped slot 50 downwardly to form parallel walls 66 on the sides of the U-shaped slot 50. A curved wall 68 at the curved end of the U-shaped slot 50 interconnects the parallel wall 66.

The basic form of the outlet end 30 is completed by an additional cold forming operation shown in FIGS. 15 and 16. A forming tool having a horseshoe shaped cavity 70 is driven into the top of the outlet end 30 while the outlet end 30 is supported by a backup die 72. The backup die 72 fits between the parallel wall 66 and curved wall 68. The horseshoe cavity forming tool 70 spanks the overhanging portion 56 so that the distal end 76 of the tubular preform 24 is driven downwardly in a perpendicular orientation relative to the length of the tubular preform. The distal end 76 of the spout 20 is closed by the formation of an arcuate wall 78. The cold forming operation forms a seam 80 where the arcuate wall 78 and parallel walls 66 flow together. The distal ends of the parallel walls 66 are deformed inwardly towards each other in said cold forming step.

An aerator trim lip 82 is formed by trimming the lower edges of the parallel wall 66, curved wall 68, and arcuate wall 78 as shown in FIG. 17. After trimming, the aerator trim lip 82 may be spot faced and reamed to finish the outlet opening 32 to receive a standard aerator.

The inlet end 34 of the water spout 20 is completed by forming an inlet trim lip 84 by trimming the inlet end 34. As shown in FIG. 19, roll form tools 86 are used to form the seal grooves 42 in the inlet end 34. Grooves 42 are provided to receive seals depending upon the type of water faucet assembly used with the spout 20.

The foregoing is a description of a preferred embodiment of the present invention and should not be read in the restrictive sense but only in explaining the underlying concepts. The invention may be further developed within the scope of the following claims.

We claim:

1. A method of making a water spout from a tube for use with a faucet assembly comprising the steps of:
   providing a tube having an inlet end and an outlet end;
   trimming said outlet end of said tube at an acute angle relative to a longitudinal axis of said tube thereby forming an elliptically shaped opening at said outlet end defined by a lower wall and an upper wall;
   bending said tube, thereby forming an arcuate portion intermediate said inlet end and said outlet end;
   punching a slot in said lower wall of said tube;
   forming a first wall extending from said lower wall of said tube about the perimeter of the slot and leaving an opening facing a distal end of said outlet end;
   forming the upper wall about said opening and thereby defining a second wall, said first wall joining said second wall such that an outlet wall is formed which extends continuously and defines a water dispensing opening;
   trimming said outlet wall to a pre-determined length; and
   machining said outlet wall to form a receptacle for an aerator.

2. The method of claim 1 further comprising the steps of drawing and annealing said tube.

3. The method of claim 1 wherein said tube is substantially elliptical in cross-section.

4. The method of claim 1 wherein said step of bending said tube comprises forming a bend of greater than 90 degrees from the inlet end to the outlet end of said tube.

5. The method of claim 1 wherein said step of punching a slot in said lower wall of said tube comprises punching a U-shaped slot having parallel sides spaced inwardly from each sidewall of said tube.

6. The method of claim 5 wherein said step of forming an outlet wall from said lower wall of said tube comprises cold heading said parallel sides in generally parallel planes, thereby forming generally parallel walls and a curved portion of said U-shaped slot interconnecting said parallel sides.

7. The method of claim 6 wherein said step of forming a portion of said upper wall comprises supporting a portion of said upper wall inside said tube while cold forming said upper wall with an arcuate forming tool, thereby forming an arcuate wall at the distal end of said tube and causing said arcuate wall to flow into said parallel side walls.

8. The method of claim 1 wherein said step of machining said outlet wall comprises reaming the inner diameter of said opening and spot facing the lower surface of said outlet wall.

9. A method of making a water spout from an elliptical tube for use with a faucet assembly comprising the steps of:
   providing a tube having an inlet end and an outlet end;
   trimming an outlet end of said tube at an acute angle relative to a longitudinal central axis of said tube, thereby forming an elliptically shaped opening at said outlet end;
   forming a pre-determined length of an inlet end of said tube into a cylindrical shape;
   bending said tube into an arcuate shape intermediate said inlet end and said outlet end;
   punching a slot in said outlet end of said tube;
   forming an outlet wall portion from said outlet end of said tube about the periphery of the slot and leaving an opening facing a distal end of said outlet end;
   deforming another portion of said outlet end, thereby joining the outlet wall portion to said another portion and thereby forming an outlet wall extending continuously and defining a water dispensing opening;
   trimming said outlet wall to a pre-determined length;
   machining said outlet wall to form a receptacle for an aerator;
   trimming said inlet end of said tube; and
   forming annular grooves in said inlet end for receiving sealing means.

10. The method of claim 9 further comprising the steps of drawing and annealing said tube.

11. The method of claim 9 wherein said step of bending said tube comprises forming a bend of greater than ninety degrees from the inlet end to the outlet end of said tube.

12. The method of claim 9 wherein said step of punching a slot in said outlet end of said tube comprises punching a U-shaped slot having parallel sides spaced inwardly from each sidewall of said tube.

13. The method of claim 12 wherein said step of forming a portion of an outlet wall from said outlet end of said tube comprises cold heading said parallel sides in generally parallel planes, thereby forming generally parallel walls and a curved portion of said U-shaped slot interconnecting said parallel sides.

14. The method of claim 13 wherein said step of deforming another portion of said outlet end comprises supporting an upper wall of said outlet end inside said tube while cold forming a distal end portion of said outlet end with an arcuate forming tool, thereby forming an arcuate wall at the distal end of said tube and causing said arcuate wall to flow into said parallel side walls and wherein said parallel side walls are curved towards each other at their distal ends during said deforming step.

15. The method of claim 9 wherein said step of machining said outlet wall comprises reaming the inner diameter of said outlet wall and spot facing the lower surface of said outlet wall.

16. The method of claim 9 wherein said step of forming a pre-determined length of an inlet end of said tube comprises retaining an intermediate portion of said tube a pre-determined distance from said inlet end of said tube while cold forming an inner diameter portion of said inlet end with a tapered cylindrical mandrel.

17. The method of claim 16 wherein said step of forming a pre-determined length of an inlet end of said tube further comprises cold forming an outer diameter portion of said inlet end with a female die.

* * * * *